(12) United States Patent
Glauning

(10) Patent No.: US 9,813,110 B2
(45) Date of Patent: Nov. 7, 2017

(54) DATA TRANSMISSION USING AN ELECTRICAL MACHINE

(71) Applicant: Robert Bosch GmbH, Stuttgart (DE)

(72) Inventor: Rainer Glauning, Leinfelden-Echterdingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 429 days.

(21) Appl. No.: 14/274,394

(22) Filed: May 9, 2014

(65) Prior Publication Data

US 2014/0339922 A1 Nov. 20, 2014

(30) Foreign Application Priority Data

May 14, 2013 (DE) .................. 10 2013 208 834

(51) Int. Cl.
*H04B 3/02* (2006.01)

(52) U.S. Cl.
CPC .................... *H04B 3/02* (2013.01)

(58) Field of Classification Search
CPC ...................................... H04B 3/02
USPC .................................. 307/145, 14
See application file for complete search history.

(56) References Cited

U.S. PATENT DOCUMENTS

| 5,619,117 A * | 4/1997 | Koenck | G01R 31/3655 320/106 |
| 8,169,298 B2 * | 5/2012 | Wiesner | G08B 13/1409 340/10.33 |
| 2005/0017679 A1 * | 1/2005 | Tashiro | H02J 7/0004 320/112 |
| 2006/0028168 A1 * | 2/2006 | Nishida | H02J 7/0031 320/106 |
| 2006/0028173 A1 * | 2/2006 | Sellers | H01M 2/1022 320/112 |
| 2007/0123303 A1 * | 5/2007 | Book | H02J 7/0003 455/557 |
| 2012/0259567 A1 * | 10/2012 | Lapierre | H02J 7/0055 702/63 |
| 2014/0095915 A1 * | 4/2014 | Hitchcock | G06F 1/3212 713/323 |

FOREIGN PATENT DOCUMENTS

| EP | 1 500 945 | 1/2005 |
| EP | 1 850 444 | 10/2007 |

\* cited by examiner

*Primary Examiner* — Rexford Barnie
*Assistant Examiner* — Joseph Inge
(74) *Attorney, Agent, or Firm* — Norton Rose Fulbright US LLP; Gerard Messina

(57) ABSTRACT

A battery pack includes an electrical energy store, a data memory and an interface for the alternative connection of the battery pack to a data source or a data sink. The data memory is designed to receive data from the data source while the interface is connected to the data source, and to supply the data in the data memory to the data sink while the interface is connected to the data sink.

12 Claims, 4 Drawing Sheets

DATA TRANSMISSION USING AN ELECTRICAL MACHINE

BACKGROUND OF THE INVENTION

1. Field of the Invention

The present invention relates to a data transmission between an electrical machine and a central control unit.

2. Description of the Related Art

An electrical machine can be connected to a rechargeable battery pack that supplies the electrical energy for operating the machine. The battery pack may be separated from the machine, for example when the energy stored in the battery pack is exhausted. The machine can include, for example, an electrically driveable bicycle, an electrical machine tool, a gardening tool or an electrical handheld tool.

When separated from the machine, the battery pack can be recharged with electrical energy in a charger. During the charging process, the electrical machine may continue to be operated using a different battery pack. It is also possible to use the battery packs in conjunction with different electrical machines; for example, a battery pack may be used for an electrical lawn edger and then for a battery-powered screwdriver.

To diagnose a battery pack, it is known to collect data within the battery pack and to exchange it with a central control unit during the charging operation by way of a data interface of the charger. The published European patent application document EP 1 500 945 A2 shows one variant, in which the central control unit sends a usage comment for a more optimal use of the battery pack on the basis of the transmitted data.

Published US patent application document 2012/0259567 A1 relates to a battery pack, which likewise collects data about its own use and is able to forward this data to a central control unit. The compiled data, for example, could include electrical characteristic data of the installed energy store or data of an installed acceleration sensor. The data can be transmitted in a wireless manner, for instance with the aid of an RFID interface.

The European patent document EP 1 850 444 B1 discloses a battery pack, which is set up to store different sound patterns in a storage device, so that a different sound signal can be played whenever the connection to a charger is severed.

The present invention is based on the objective of providing better technology for transmitting data of an electrical machine. The present invention achieves this objective by a battery pack, a use, a method, and a computer program product having the features of the independent claims. The dependent claims reflect preferred specific embodiments.

BRIEF SUMMARY OF THE INVENTION

A battery pack according to the invention includes an electrical energy store, a data memory and an interface for the alternative connection of the battery pack to a data source or a data sink. The data memory is designed to store data from the data source while the interface is connected to the data source, and to supply the data in the data memory to the data sink while the interface is connected to the data sink.

The battery pack may be used in an operation that alternates between an electrical machine and a charger connected to the central control unit. The battery pack is able to buffer-store data of the electrical machine or the central control unit and to later supply the stored data to the respective other device. It is also possible to use the battery pack for integrating an electrical machine into a data network that includes the central control unit as well.

In one preferred specific embodiment, the data memory includes a protected data memory to store identification information. The identification information may be used to identify and authenticate the battery pack to the machine or the charger, or vice versa. This prevents data from being output to another device instead of the actual addressee.

One use according to the present invention for the described battery pack for the transmission of data between an electrical machine and a central control unit utilizes the electrical machine as a data source and the central control unit as a data sink, or vice versa. It is decisive that the battery pack receives data and subsequently supplies data that were not generated or compiled by the battery pack but are transported in the data memory of the battery pack between the electrical machine and the central control unit.

A method according to the invention for transmitting data from a data source to a data sink, the data source being included in an electrical machine and the data sink being included in a central control unit, or vice versa, encompasses steps for transmitting data from the data source into a data memory of a battery pack while the battery pack is connected to the data source, and for transmitting data from the data memory to the data sink while the battery pack is connected to the data sink.

If the battery pack is alternately used for the electrical machine and for an element that is connected to the central control unit, such as a charger, then a data transport may be established without directly connecting the electrical machine to a network to which the central control unit is connected as well. Instead, the alternating use of the battery pack, which is usually motivated by the required recharging of an energy store in the battery pack, may be used to establish a data bridge between the central control unit or a charger connected to it, and the electrical machine.

In one preferred specific embodiment, identifying information is transmitted between the battery pack and the data source or the data sink, the data being transmitted into or out of the data memory only if the transmitted identifying information indicates a permitted information partner.

In one simple specific embodiment, the data held in the data memory may include an addressee, which must match identifying information of the data sink able to be connected to the battery pack, before the data are provided. In a more complex variant, the identifying information may form the basis of a cryptographic method for identifying or authenticating data accesses.

In one further preferred specific embodiment, usage information of the electrical machine is transmitted to the central control unit by means of the battery pack, and usage comments in response to the usage information are transmitted from the central control unit to the electric machine with the aid of the battery pack. In one specific embodiment, different battery packs may be used for carrying the data in different directions. The central control unit can compile and process the usage information and possibly correlate it with usage information of other electrical machines, in order to provide improved usage information. By transmitting usage comments to the electrical machine, the analysis of the usage information may be directly incorporated into a more optimal use of the electrical machine. For example, the usage comments may include updated program code for operating the electrical machine or a usage comment. The electrical machine may output the usage comments to an operator prior to or during its operation.

The response is preferably based on a great variety of usage information of different electrical machines, so that experiences that were collected also on the basis of other electrical machines may contribute to an improved use of the first electrical machine.

In one further specific embodiment, a function of the battery pack or the electrical machine is deactivated in response, if it has previously been determined on the basis of the usage information that the battery pack or the electrical machine had been used without authorization. For example, the electrical machine or the battery pack may be protected from theft. In addition, it is possible to restrict the electric machine or the battery pack to a usage under predefined conditions. If these conditions are not satisfied, this could be reflected in the usage functions. The deactivated function of the battery pack or the electrical machine may relate to a subfunction or it may heavily restrict or even prevent the primary usability of the machine or the battery pack.

In one still further specific embodiment, additional information is acquired in the battery pack, and the acquired data are appended to the data transmitted to the data sink. For example, the data may include administrative data such as a date, a time or a history of transmission nodes of stored data on the path between the data source and the data sink. However, the additional information may also be acquired by the battery pack, especially with the aid of a sensor, so that, for instance, measurements of the electrical device and the battery pack are able to be correlated with each other, in order to ascertain whether a particular problem is preferably to be remedied by the battery pack or by the electrical machine.

A computer program product includes program code means for carrying out the described method when the computer program product is run on a processing device or stored on a computer-readable data carrier.

DETAILED DESCRIPTION OF THE INVENTION

Figure 1:
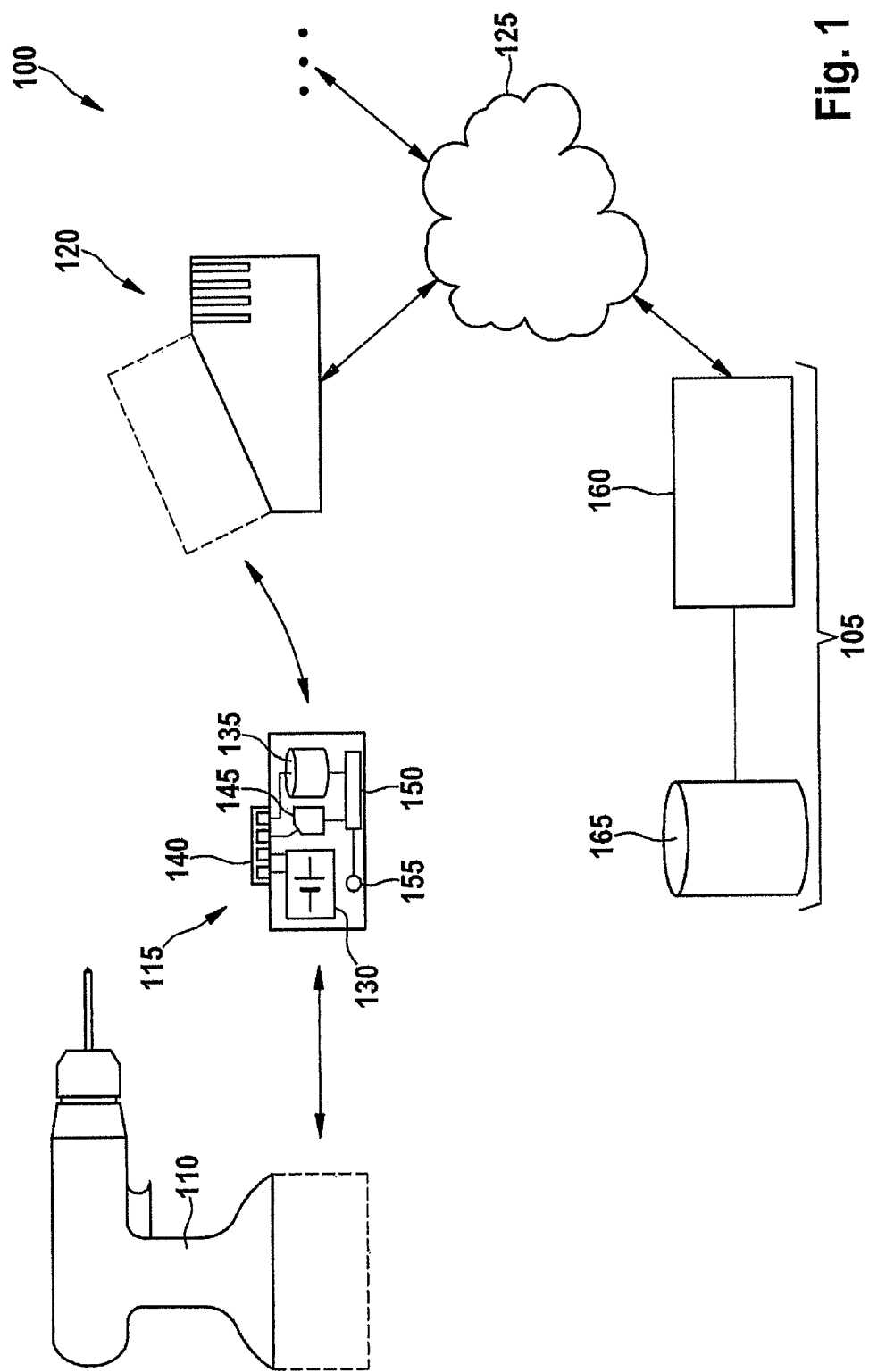
FIG. 1 shows a system for the exchange of information between a central control unit and an electrical machine.

FIG. 1 shows a system 100 for the exchange of information between a central control unit 105 and an electrical machine 110. In addition to central control unit 105 and electrical machine 110, system 100 includes a battery pack 115 and, optionally, a charger 120. Charger 120 is permanently or intermittently connected to central control unit 105. The connection may be made directly or via a data network 125, such as the Internet, the GSM network or some other data network. As a rule, charger 120 is set up to exchange both data and electrical energy with battery pack 115. Charger 120 may use different types of charging technology, such as an energy converter of an energy supply network for supplying households with an alternating current, for example, or as a direct current converter on board of a motor vehicle. The electrical energy can also be transmitted to battery pack 115 in a wireless manner, especially via inductive coupling.

It should be noted that charger 120 in system 100 of FIG. 1 functions as an interface for central control unit 105 and does not assume the role of an autonomous data processing system. In terms of data technology, it is merely an interface of central control unit 105, which may also be considered part of data network 125 and preferably behaves in a completely transparent manner in terms of data technology. As an alternative, a different interface may also be provided for temporarily connecting battery pack 115 to central control unit 105, such as a near field device or a cable-bound interface. It is also possible to connect additional battery packs 115 to central control unit 105, either directly or via data network 125, and additional chargers 120 or other interfaces may be provided.

Battery pack 115 includes an electrical energy store 130, e.g., a lithium-ion or nickel metal hybrid battery pack, for storing electrical energy, a data memory 135 for buffer-storing data, and an interface 140 for connecting battery pack 115 either to a data source or a data sink. If data of electrical machine 110 are stored, for example, then machine 110 represents the data source; if a transmission of data takes place in the reverse direction, then electrical machine 110 represents the data sink. This applies correspondingly to a transmission of data between battery pack 115 and central control unit 105.

Interface 140 is preferably set up both for electrical energy and data. Although other constellations are conceivable as well, electrical energy is received during a standard operation of charger 120 and buffer-stored in electrical energy store 130 while interface 140 is connected to charger 120, and electrical energy is supplied from electrical energy store 130 of electrical machine 110 when interface 140 is connected to electrical machine 110 during a later point in time.

In one preferred specific embodiment, data memory 135 includes a protected memory 145, which is shown as a separate memory by way of example in the representation of FIG. 1. Protected memory 145 is set up to store sensitive information, e.g., identifying information of battery pack 115 or permitted information and communication partners, e.g., machine 110, charger 120, or central control unit 105. To control the receiving and emitting both of electrical energy and data, a processing unit 150 is preferably provided as well. A sensor 155 may additionally be provided for compiling data on the part of battery pack 115. The compiled data may be buffer-stored in data memory 135, for instance. The supplied data, for example, could include a charge and discharge behavior, a temperature during a charge and discharge process, a usage frequency, a storage condition or other information supplied by sensor 155. In one specific development, sensor 155 is equipped with a camera to identify an operator.

Central control unit 105 includes a processing unit 160 and a data memory 165. Processing unit 160 is set up to receive usage information of electrical machine 110 via battery pack 115 and charger 120 and/or data network 125 and to store it in data memory 165. Furthermore, processing unit 160 is set up to correlate the stored data with each other. For example, it is possible to determine a frequent or systematic defect of a particular component of the electrical machine via a multitude of machines of the same design.

In addition, processing unit 160 may be set up to provide a usage comment on the basis of the usage information of electrical machine 110 and of possibly still further electrical machines 110, and to transmit it to electrical machine 110. The usage comment by sensor 155 may relate to updated operating parameters, an updated control program, user information or authentication information, for example.

Figure 2:
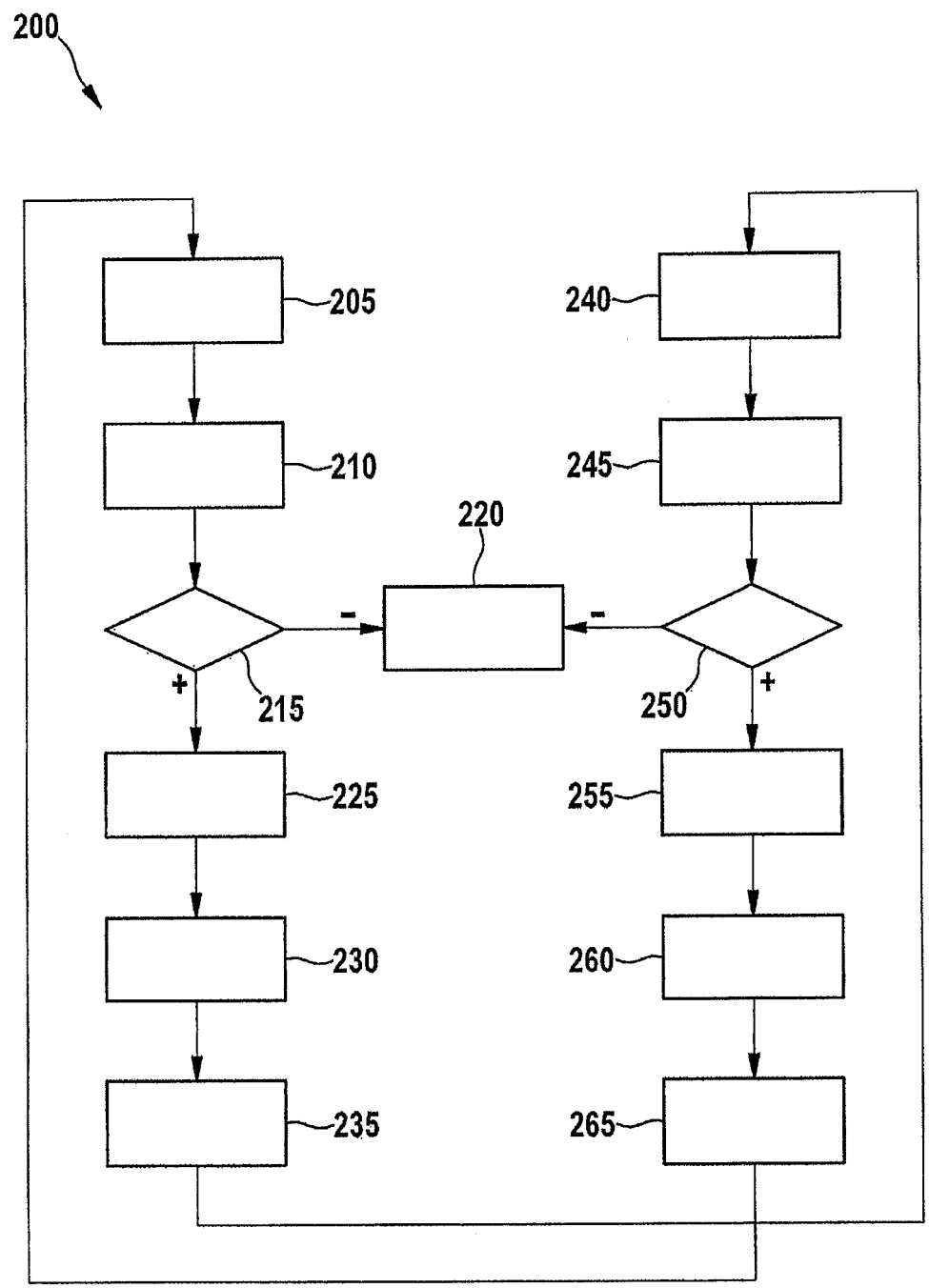
FIG. 2 shows a flow chart of a first method for the exchange of information between a central control unit and the electrical machine of FIG. 1.

FIG. 2 shows a flow chart of a first method 200 for the exchange of information between central control unit 105 and electrical machine 110 of system 110 from FIG. 1. A data transmission from electrical machine 110 to central control unit 105 is assumed here merely as an example.

In a first step 205, battery pack 115 is connected to a data source, such as electrical machine 110. In an optional subsequent step 210, identifying information is exchanged between battery pack 115 and machine 110. In a step 215, it is possible to determine whether the identification was successful, that is to say, whether a transmission request for data from electrical machine 110 as data source, to battery pack 115 has arrived. If the comparison has a negative result, method 200 is terminated in a step 220. In the other case, data are transferred in a step 225 from electrical machine 110 as the data source, into data memory 135 of battery pack 115. In a step 230, it is furthermore possible to import electrical energy into electrical energy store 130 or to transmit it from there. In a step 235, battery pack 115 is disconnected from electrical machine 110.

The following steps 240-265 correspond in pairs to steps 205-235, with the difference that the data previously stored in data memory 135 are transmitted to a data sink, especially central control unit 105, instead of being received from a data source. In one specific embodiment, in which data are exchanged bidirectionally, that is to say, electrical machine 110 represents both the data source for predefined first data and the data sink for second data, for example, a data exchange in the respective other direction may take place as well in one of, or both, steps 225 and 255.

In step 240, battery pack 115 is connected to charger 120 or to another interface that is in communication with central control unit 105. In step 245, identifying information is optionally exchanged between battery pack 115 and central control unit 105 or charger 120, and in a step 250, it is checked whether the identifying information is correct. If this is not the case, method 200 ends with step 220. Method 200 may then branch back to step 205 and be run through again. If the identifying information is correct, on the other hand, in step 255, the data from data memory 135, previously received from electrical machine 110, are supplied to central control unit 105. Optionally, electrical energy is received or output in a step 260, before battery pack 115 is separated from central control unit 105 in a step 265.

In steps 225 or 255, transmitted data may also be supplemented by additional data provided by battery pack 115. These data may be ascertained at this particular point in time or have previously been stored and relate to sensor values of sensor 155, for instance. However, the data may also include administrative information supplied by battery pack 115 during the communication process, such as an identification of communication parties, compilation instants of data, or a communication instant.

Figure 3:
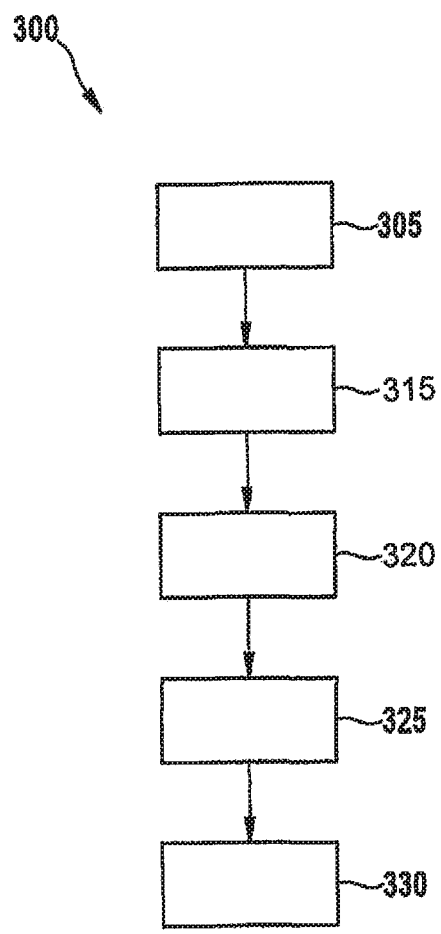
FIG. 3 shows a flow chart of a second method for determining a usage comment in response to received usage information in the system from FIG. 1.

FIG. 3 shows a flow chart of a second method 300 for determining a usage comment in response to received usage information in system 100 from FIG. 1. Method 300 is set up to be carried out on processing device 160 of central control unit 105, in particular. In a first step 305, usage information is received from electrical machine 110, whereupon the usage information is stored in data memory 165, preferably by interconnecting a database. In a step 315, the stored usage information is correlated with additional information, such as older usage information of the same electrical machine 110 or usage information of other electrical machines 110, for example. In so doing, at step 320, it is possible to perform statistical analyses of existing usage information of electrical machines 110 of the same or also a different type. In a step 325, a usage comment is determined on the basis of the previous analysis, and transmitted to electrical machine 110 in a step 330.

Figure 4:
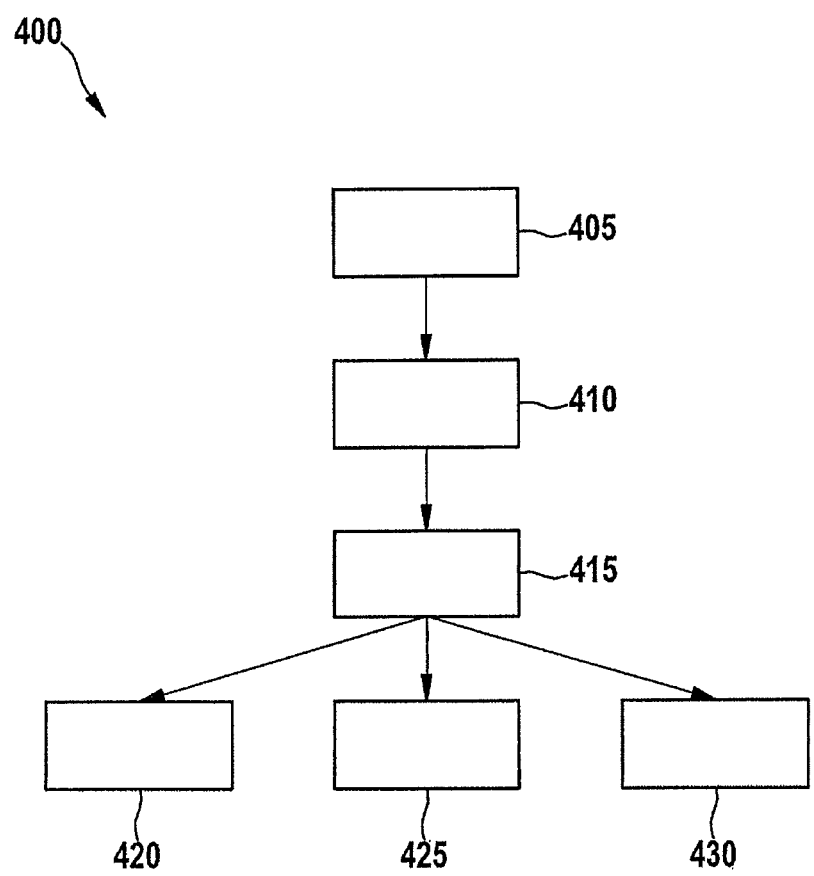
FIG. 4 shows a flow chart of a third method for analyzing a received usage comment by the electrical machine of FIG. 1.

FIG. 4 shows a flow chart of a third method for analyzing a received usage comment by the electrical machine 110 in system 100 of FIG. 1. Method 400 is set up to be run through on a processing device of electrical machine 110, in particular.

In a first step 405, usage information compiled by electrical machine 110 is transmitted to central control unit 105, as explained in greater detail in the previous text with reference to FIG. 2. In a step 410, a usage comment, which may have been determined with the aid of method 300 from FIG. 3, for example, is received and analyzed in a step 415.

The usage comment may have different characters, three of which are shown in FIG. 4 by way of example. In a first variant, operating parameters or a control program of electrical machine 110 are/is updated in step 420. This allows a better or more wear-free operation of electrical machine 110. In a second alternative, electrical machine 110 is taken out of operation because the usage information indicates an unauthorized use in step 425. Electrical machine 110 may have been reported as stolen, for example. This makes it possible to remove the practical use from stolen machine 110, so that other thefts are discouraged. In a third variant, an operator of machine 110 is informed of a more optimal usage possibility of machine 110 in a step 430. This may include heretofore unused capabilities of electrical machine 110, available accessories or an operation of machine 110 by the operator that is not yet fully correct.

The data that are acquired and transmitted to central control unit 105 may come from machine 110, battery pack 115 or charger 120. In addition to application protocols, fault protocols and used program versions of these three data sources, still further information may be compiled as well.

On the part of machine 110, for example, a utilized accessory or a peak value or a current or voltage characteristic may be recorded. The acquired information may be used to derive the intermediate information that machine 110 is a battery-powered screwdriver, which is often used together with a drill bit having an 8 mm diameter.

On the part of battery pack 115, it is possible to detect a machine 100 for which the battery pack was used, a position in space, an alignment with respect to the earth's magnetic field, a time or a geographical position or a peak value or a characteristic of a current, a voltage, a cell temperature, an ambient temperature, an acceleration, or moisture.

Based on this information, a number of intermediate statements regarding the use of battery pack 115 may be made, such as:

The use of battery pack 115 in conjunction with a particular machine 110 (type, serial number);
The use of battery pack 115 in conjunction with a particular charger 120 (type, serial number);
The use of battery pack 115 under specific climatic conditions;
The use of machine 110 and battery pack 115 in a particular orientation, e.g., above the head;
The use in the north-south alignment (such as drilling in a north façade);
Battery pack 115 was used with a percussion drill;
Battery pack 115 was dropped;

When and for how long battery pack 115 was used (intensive user, night shift?);

At which locations was machine 110 or battery pack 115 used? (e.g., fixed/changing location of use).

On the part of charger 120, a used battery pack 115, a position in space, a time, a geographical position or a peak value or a characteristic of an ambient temperature, an acceleration or moisture, for example, are able to be recorded. The frequency and intensity of the use of charger 120, for example, is able to be determined on this basis. Other potential intermediate information includes:

Which battery pack 115 (type, serial number) is being charged?

Under which climatic conditions is battery pack 115 being charged?

Was charger 120 used as a table or wall charger?

How roughly is charger 120 handled?

Frequency of use and use distribution of charger 120 across day/night/month/year;

At which locations was charger 120 used? (e.g., fixed/changing location of use).

Is charger situated in the same location where the packs are used?

By combining and processing the detected information and/or intermediate findings by central control unit 105, it is then possible to obtain further knowledge. For example, it can be determined that a rechargeable hammer is operated as an electric machine 110, using XL battery packs (5S2P configuration) of 4.0 Ah in 70% of the cases, with L-battery packs (5S1P configuration) of 2.0 Ah in 15% of the cases and with XL battery packs (5S2P configuration) of 2.6 AH in 15% of the cases. As applications, 15% may be determined as overhead drilling in interior spaces, 20% outside, 30% of which took place in the rain. Overhead drilling may always have taken place while using the lighter L-battery pack (5S1P configuration). Machine 110 may have been overloaded, which is able to be determined based on the transmitted fault protocol, and a newly optimized software version may be required that fits better with the customer-specific application mix.

In the same example, it can additionally be determined in addition that the owner of machine 110 or battery pack 115 is working within a radius of 60 km from his home address. During the warm season 2012, the main use may have occurred at a particular location in an outside area, whereas the use during the cold season of said year may have taken place at a different location for the most part.

In addition, it is possible to determine that, battery pack 115 is charged in the home workshop during the hours between 6 and 7 PM 80% of the time, the charging process especially frequently being started on free days. 20% of the time, the charging may have occurred at the same location in which machine 110 was actually used as well (such as a building site). Work often started in the mornings, between 7 and 8 AM, while the ambient temperatures were still cold.

What is claimed is:

1. A battery pack, comprising:
an electrical energy store;
a data memory; and
an interface for selective alternative connection of the battery pack to a power tool and a battery charger connected through a data network to a central control unit, the battery pack powering the power tool when connected to the power tool, and the battery pack being charged by the battery charger when connected to the battery charger;

wherein the data memory is configured to (i) receive and store first data from the power tool while the interface is connected to the power tool, and provide the first data to the central control unit over the data network via the battery charger while the interface is connected to the battery charger, and (ii) store second data from the central control unit received over the data network via the battery charger when the interface is connected to the battery charger, and provide the second data to the power tool while the interface is connected to the power tool; and wherein usage information regarding usage of the power tool is transmitted over the data network to the central control unit via the data memory of the battery pack, and wherein usage comments are transmitted, in response to the usage information, from the central control unit over the data network to the power tool over the data network via the data memory of the battery pack.

2. The battery pack as recited in claim 1, wherein the data memory includes a protected memory to hold identifying information.

3. The battery pack of claim 1, wherein the power tool is a separate autonomous device from the battery charger, which is a separate autonomous device from the battery pack.

4. The battery pack of claim 1, wherein the central control unit is a remotely located relative to the battery charger.

5. The battery pack of claim 1, wherein the power tool is a handheld power tool.

6. A method for transmitting data from a data source, which is part of one of a power tool of a central control unit connected to a battery charger via a data network, to a data sink which is part of the other one of the power tool or the central control unit, the method comprising:

transmitting data regarding usage of the power tool from the power tool to a data memory of a battery pack while the battery pack is connected to the power tool, the power tool being powered by the battery pack;

transmitting the usage data from the data memory of the battery pack over the data network to the central control unit via the battery charger while the battery pack is connected to the battery charger, the battery pack being charged by the battery charger;

transmitting usage comments, in response to the usage information, from the central control unit to the power tool via the data memory of the battery pack;

wherein the transmitting of the usage comments includes: i) transmitting the usage comments from the central control unit over the data network to the data memory of the battery pack via the battery charger while the battery pack is connected to the battery charger, and ii) receiving the usage comments, by the power tool from the data memory of the battery pack when the battery pack is connected to the power tool.

7. The method as recited in claim 6, further comprising:
transmitting identifying information between the battery pack and one of the power tool or the central control unit, data being transmitted one of into or out of the data memory only if the transmitted identifying information indicates a permitted information partner.

8. The method as recited in claim 6, wherein the response is based on multiple items of usage information from different power tools.

9. The method as recited in claim 6, wherein a function of one of the battery pack or the power tool is deactivated in response to the usage information if, on the basis of the usage information, the one of the battery pack or the power tool is determined to have been previously used without authorization.

10. The method as recited in claim 6, wherein additional information is compiled in the battery pack, and the compiled additional information data are appended to the data transmitted.

11. The method as recited in claim 6, wherein the central control unit determines the usage comments to transmit based on usage data from other power tools.

12. A non-transitory computer-readable data storage medium storing a computer program having program codes which, when executed on a computer, performs a method for transmitting data from a power tool or a central control unit, to the other one of the power tool or the central control unit, the method comprising:

transmitting data regarding usage of the power tool from the power tool to a data memory of a battery pack while the battery pack is connected to the power tool, the power tool being powered by the battery pack while the battery pack is connected to the power tool;

transmitting the usage data from the data memory of the battery pack over a data network to the central control unit via the battery charger while the battery pack is connected to the battery charger, the battery pack being charged by the battery charger while the battery pack is connected to the battery charger;

transmitting usage comments, in response to the usage information, from the central control unit to the power tool via the data memory of the battery pack;

wherein the transmitting of the usage comments includes:
i) transmitting the usage comments from the central control unit over the data network to the data memory of the battery pack via the battery charger while the battery pack is connected to the battery charger, and ii) receiving the usage comments, by the power tool from the data memory of the battery pack when the battery pack is connected to the power tool.

* * * * *